US005681660A

United States Patent [19]

Bull et al.

[11] Patent Number: 5,681,660

[45] Date of Patent: Oct. 28, 1997

[54] PROTECTIVE CLEAR LAYER FOR IMAGES

[75] Inventors: Sally J. Bull, North St. Paul; Lois A. McCray, St. Paul, both of Minn.

[73] Assignee: Minnesota Mining and Manufacturing Company, St. Paul, Minn.

[21] Appl. No.: 613,741

[22] Filed: Feb. 21, 1996

[51] Int. Cl.[6] .......... B32B 27/00

[52] U.S. Cl. .......... 428/500; 428/195; 428/203; 428/488.4; 428/515

[58] Field of Search .......... 428/411.1, 447, 428/432, 500, 488.4, 195, 203, 511; 358/166

[56] References Cited

U.S. PATENT DOCUMENTS

| | | | |
|---|---|---|---|
| 4,857,372 | 8/1989 | Ginkel et al. | 428/42 |
| 5,114,520 | 5/1992 | Wang, Jr. et al. | 156/240 |
| 5,192,609 | 3/1993 | Carroll, Jr. | 428/328 |
| 5,262,242 | 11/1993 | Tomiyama et al. | 428/423.1 |
| 5,370,960 | 12/1994 | Cahill et al. | 430/124 |
| 5,397,634 | 3/1995 | Cahill et al. | 428/304.4 |
| 5,484,844 | 1/1996 | Oshima et al. | 524/521 |

FOREIGN PATENT DOCUMENTS

| | | | |
|---|---|---|---|
| 0 232 959 | 8/1987 | European Pat. Off. | B44C 1/17 |
| 0 453 256 A2 | 10/1991 | European Pat. Off. | G03G 13/16 |
| 0 625 430 A1 | 11/1994 | European Pat. Off. | B41M 7/02 |
| WO 93/22137 | 11/1993 | WIPO | B32B 27/08 |
| WO 95/06564 | 3/1995 | WIPO | B41M 3/12 |
| WO 95/18720 | 7/1995 | WIPO | B44C 1/17 |

OTHER PUBLICATIONS

Nielsen, "Coating Composition to Enhance Durability of Xerographic Images" *Xerox Disclosure Journal* vol. 14, No. 1, Jan. 1989 p. 37 XP000093449.

*Primary Examiner*—William Krynski
*Attorney, Agent, or Firm*—Gary L. Griswold; Walter N. Kirn; John H. Hornickel

[57] ABSTRACT

A transparent, protective layer is disclosed for transfer from a release liner to a imaged substrate. The layer has a composition including vinyl resin, acrylic resin, optional plasticizer, and optional stabilizer. The layer is transferred at melt temperatures to the imaged substrate, followed by removal of the release liner. The melt temperatures do not harm the image or the substrate.

7 Claims, 1 Drawing Sheet

PROTECTIVE CLEAR LAYER FOR IMAGES

FIELD OF THE INVENTION

This invention relates to a clear layer for hot melt application to images on substrates.

BACKGROUND OF THE INVENTION

Electronic graphics produced via electrographic processes, especially electrostatic processes, is rapidly becoming a preferred method for the formation of images. The Scotchprint™ Electronic Graphics Systems commercially available from Minnesota Mining and Manufacturing Company of St. Paul, Minn. ("3M Company") uses an electrostatic process for forming an image and transferring that image to a durable substrate. One description of the process is found in U.S. Pat. No. 5,114,520 (Wang et at.).

The image formed on a durable substrate requires protection from abrasion and ultraviolet light. A transparent overlaminate, comprising a transparent durable film covered on a major surface by a transparent pressure sensitive adhesive, is preferably applied over the image on the durable substrate. Commercially available transparent overlaminates include Product Nos. 8910, 8911, 8912, 8913, 8920, 8930, and 8931 films from the Commercial Graphics Division of 3M Company, St. Paul, Minn. Some of the transparent overlaminates include a vinyl or polyester film covered with a pressure sensitive adhesive, which is in turn is protected by a paper or polyester liner until usage. Other transparent overlaminates include a vinyl or polyester film covered with a hot melt adhesive, and a scrim liner to prevent blocking.

In the absence of the use of a transparent overlaminate, some fabricators apply a protective clear coat of a vinyl/acrylic material, such as Product Nos. 3920, 9720, 66201, and 2120 protective coatings from the Commercial Graphics Division of 3M Company to protect the durable, imaged substrate. But such manual application of a liquid to a solid flat surface is subject to the inconsistencies of climate, circumstances, and craftsmen.

SUMMARY OF THE INVENTION

The art of electronic graphics needs an inexpensive, durable, transparent layer to protect images formed on a major surface of durable substrates.

One aspect of the present invention is an inexpensive, durable, transparent layer formed on a release liner. A layer to cover and protect an imaged substrate comprises a composition comprising vinyl chloride resin, acrylic resin, optional plasticizer, and optional stabilizer, wherein the composition has a melt temperature sufficient to cause the composition to melt on one major surface of the imaged substrate without harming the imaged substrate.

Another aspect of the present invention is a method of forming an inexpensive, durable, transparent layer formed on an image residing on a durable substrate. A method of protecting an imaged substrate comprises the steps of forming a composite of a release liner and a durable, transparent layer having a composition comprising vinyl chloride resin, acrylic resin, optional plasticizer, and optional stabilizer, wherein the composition has a melt temperature sufficient to cause the composition to melt on the imaged substrate without harming the imaged substrate; and contacting the layer from the composite to the imaged substrate by melting the composition.

Another aspect of the invention is a composite of an inexpensive, durable, transparent layer covering a durable, imaged substrate. A composite comprises a transparent layer covering a durable, imaged substrate, wherein the transparent layer comprises a composition comprising vinyl chloride resin, acrylic resin, optional plasticizer, and optional stabilizer, wherein the composition has a melt temperature sufficient to cause the composition to melt on one major surface of the imaged substrate without harming the imaged substrate.

A feature of the invention is the formation of the durable, transparent layer on a release layer from a thermally processable composition.

Another feature of the invention is the transfer of the durable, transparent layer from the release layer to the durable, imaged substrate.

An advantage of the invention is the ability to transfer the transparent layer from a release layer to a durable, imaged substrate using "hot melt" temperatures.

Another advantage of the invention is the ability of the durable, transparent layer to provide stabilization and protection from abrasion and ultraviolet light degradation.

Another advantage of the invention is the avoidance of laminates of transparent films and transparent adhesives.

Therefore, the present invention includes a layer to cover and protect an imaged substrate, comprising a composition comprising vinyl chloride resin, acrylic resin, optional plasticizer, and optional stabilizer, wherein the composition has a melt temperature sufficient to cause the composition to melt on one major surface of the imaged substrate without harming the imaged substrate.

Therefore, the present invention also includes a method of protecting an imaged substrate, comprising the steps of forming a composite of a release liner and a durable, transparent layer having a composition comprising vinyl chloride resin, acrylic resin, optional plasticizer, and optional stabilizer, wherein the composition has a melt temperature sufficient to cause the composition to melt on the imaged substrate without harming the imaged substrate; and transferring the layer from the composite to the imaged substrate by melting the composition.

Embodiments of the invention are described with reference to the following drawings.

EMBODIMENTS OF THE INVENTION

Figure 1:
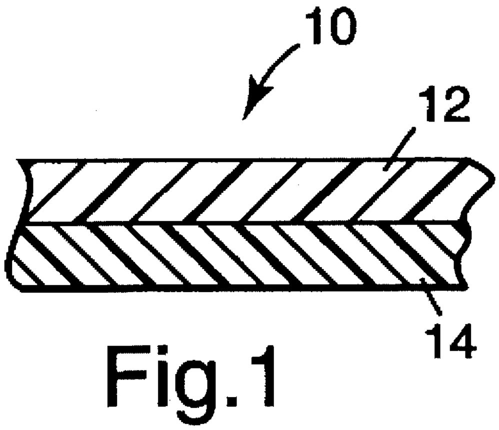
FIG. 1 illustrates a cross-sectional view of the durable, transparent layer of the present invention in combination with the release layer.

FIG. 1 shows a multilayered composite 10 comprising a durable, transparent layer 12 of a thermally processable composition and a release liner 14.

Liner 14 can be made from any conventional release liner material known to those skilled in the art. Selection of the liner 14 should recognize the nature of the surface of liner 14 contacting layer 12 will determine the appearance of the outer surface of layer 12 on the durable, imaged substrate. Nonlimiting examples of release liners include silicone coated paper, silicone coated polyester, urea alkyd coated paper, urea alkyd coated polyester, and the like. Particularly preferred for release liner 14 is a urea alkyd coated polyester having a urea polymer coating comprising a polyurea alkyd formulation of 0.005 mm caliper on a 0.07 mm polyester film.

Release liner 14 can have a gloss ranging from about 5 to about 95 and preferably from about 80 to about 95. Gloss is measured by a Gardner 60° Glossmeter using published techniques known to those skilled in the art such as ASTM Standard No. D523.

Durable, transparent layer 12 comprises a thermally processable composition containing vinyl chloride, acrylic resin, an optional plasticizer, and an optional stabilizer where the layer has a sufficient melt temperature to be thermally processable to cause layer 12 to melt on an imaged substrate without causing harm to the image or the substrate.

Vinyl chloride is an industrial chemical commercially available from many sources throughout the word. Desirably, the vinyl chloride resin useful in layer 12 comprises from about 80 to about 90 weight percent vinyl chloride and about 10 to about 20 weight percent vinyl acetate. Preferably, the vinyl chloride useful in the present invention is a vinyl chloride resin comprising VYHH vinyl chloride resin commercially available from Union Carbide of Charleston, W.V.

Acrylic resin is also an industrial chemical commercially available from many sources throughout the word. Desirably, the acrylic resin useful in layer 12 comprises from about 75,000 to about 125,000 number average molecular weight. Preferably, the acrylic resin useful in the present invention is an acrylic resin comprising B-82 acrylic resin having about 100,000 molecular weight commercially available from Rohm and Haas of Philadelphia, Pa.

Optionally, the composition for layer 12 comprises a plasticizer to aid in the formation of layer 12 and its transfer to a durable, imaged substrate. Nonlimiting examples of plasticizer include 1,4-butylene glycol; adipic acid; butyloctyl phthalate; hydrocarbon resins; di(2-ethylhexyl) azelate; dibutyl azelate; dihexyl azelate; epoxidized soybean oil and the like. Particularly preferred for a plasticizer, if present in the composition of layer 12, is Vikoflex 7170 plasticizer commercially available from ATOChem of Philadelphia, Pa.

Optionally, the composition for layer 12 comprises a stabilizer to aid in the formation of layer 12, provide ultraviolet resistance, and assist transfer to a durable, imaged substrate. Nonlimiting examples of stabilizer include Hal-Lub, Hal-Base, Hal-Garb, Hal-Stab brand hindered amine light stabilizers commercially available from Hal-stab Company of Hammond, Ind.; Nuostabe V1923 brand ultraviolet light stabilizer commercially available from Witco of Greenwich, Conn.; Cosorb brand ultraviolet light stabilizer commercially available from 3M Company of St. Paul, Minn.; and Tinuvin brand HAL stabilizers commercially available from Ciba-Geigy Corp. Of Greensboro, N.C. Particularly preferred for a stabilizer, if present in the composition of layer 12, is Tinuvin 1130 and Tinuvin 292 HAL stabilizers from Ciba-Geigy or Nuostabe V1923 stabilizer.

The layer 12 can have a composition ranging from about 49 to about 72 weight percent of vinyl chloride, from about 9 to about 33 weight percent acrylic resin, from about 0 to about 33 weight percent plasticizer, and from about 0 to about 10 weight percent stabilizer.

Desirably, layer 12 can have composition ranging from about 49 to about 67 weight percent of vinyl chloride, from about 15 to about 33 weight percent acrylic resin, from about 0 to about 20 weight percent plasticizer, and from about 0 to about 8 weight percent stabilizer.

Preferably, layer 12 can have composition ranging from about 55 to about 65 weight percent of vinyl chloride, from about 16 to about 27 weight percent acrylic resin, from about 10 to about 16 weight percent plasticizer, and from about 2 to about 6 weight percent stabilizer.

Composition for layer 12 can be prepared by dissolving the ingredients into solvents such as ketones and aromatics, preferably methyl ethyl ketone, methyl isobutyl ketone and toluene, more preferably in equal parts of such solvents. Layer 12 is knife or gravure coated on liner 14 with a coating weight ranging from about 0.01 g to about 0.02 g to yield a dry thickness of from about 0.05 mm (0.0002 inches) to about 0.13 min. Preferably, liner 14 has a thickness ranging from about 0.5 mm (0.002 inches) to about 1 mm and layer 12 has a thickness ranging from about 0.5 mm (0.002 inches) to about 1 mm.

After coating, layer 12 is dried on liner 14 to remove solvents at a temperature ranging from about 90° C. to about 120° C. for about 2 minutes. Composite 10 is then stored until usage.

Figure 2:
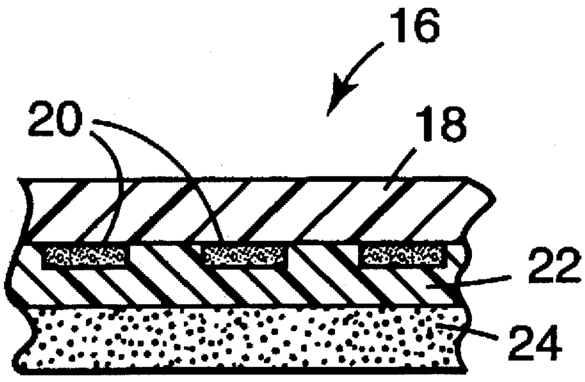
FIG. 2 illustrates a cross-sectional view of the durable, transparent layer of the present invention in combination with a durable, imaged substrate.

FIG. 2 illustrates a protected product 16 with the use of layer 12 transferred and reconstituted as layer 18 on an image 20 residing on a major surface of a durable substrate 22.

Layer 18 protects image 20 and substrate 22 without enveloping substrate 22. Preferably, substrate 22 has image 20 on one major surface and a field 24 of adhesive on the opposing major surface. Layer 18 is inappropriate to cover the field 24 of pressure sensitive adhesive.

Image 20 can be formed using any conventional electronic process. Nonlimiting examples include electrographic processes, electrophotographic processes, electrostatic processes, inkjet printing processes, and the like.

Image 20 can comprises dyes, pigments, or combinations of both from toners, inks, or paints, all as known to those skilled in the art.

Preferably, image 20 comprises compositions capable of withstanding processing temperatures of less than about 105° C., and preferably less than about 100° C.

Substrate 22 can be any durable substrate known to those skilled in the art of image graphics. Nonlimiting examples include vinyl substrates as DAF Screen film commercially available from DAF Products of Clifton, N.J. and vinyl substrates commercially available as 8620, 8621, 8626, 8628, 8640, 8641, 8642, 8643, 8644, 8650-10, 8650-20, 3636-114, and 8650-114 films from 3M Company.

Preferably, substrates useful in the present invention include any of the Scotchprint™ 8600 Series films identified above and other substrates having an adhesive field on the major surface opposing the major surface on which image 20 resides.

Layer 12 is transferred from liner 14 on composite 10 to image 20 and substrate 22 by application of heat. The layer 12 is melted and reconstituted as layer 18. Thermal processing of the transfer can range from about 76° to about 143° C. Preferably, the transfer temperature can range from about 88° C. to about 143° C.

Layer 18 can have a caliper of from about 0.07 mm (0.0003 inches) to about 0.2 mm when adhered to image 20 and substrate 22. Preferably, the caliper ranges from about 0.10 mm to about 0.15 mm.

After layer 12 is applied to image 20 and substrate 22 and reconstituted as layer 18, liner 14 is removed, rolled, and recycled for later use.

Machinery conventionally used in the formation of durable imaged substrates can be used for the thermal transfer of layer 12 to substrate 22. Nonlimiting examples of machinery include laminators such as Scotchprint™ 9540 and 9542 brand laminators from 3M Company.

Alternatively, when substrate 22 is an imaging paper, such as Scotchprint™ brand 8610 electrostatic imaging paper from 3M Company, a wet transfer process can be employed to exchange substrate 22 for a durable film. Wet transfer processes useful with composite 10 include applying layer 12 according to the method of the present invention to a substrate 22 which is an electrostatic imaging paper, such as Diel paper from Sihl Company of Zurich, Switzerland or No. 8610 imaging paper from 3M Company, upon which an image 20 resides. Then using moisture treatment, the back of paper substrate 22 is wetted and the bottom paper layer is peeled away to reveal a dielectric layer having the image and then laminated to a desirable durable film. The liner 14 is peeled away to reveal the protective dear layer 18, the image 20, and the dielectric layer of the substrate 22, and the durable film.

Alternatively, one could place an image 20 on layer 12 of composite 10 and then transfer layer 12 with image 20 to a substrate 22 to become layer 18, image 20, and substrate 22 as seen in FIG. 2. In this embodiment method, one can use an electrostatic imaging transfer process such as the Scotchprint™ Electronic Imaging system and electrostatic imaging paper, such as No. 8601 image transfer paper, both commercially available from 3M Company, to place a 4-color toner image from the paper on layer 12, after which the imaging paper is pealed away leaving image 20 on layer 12 for transfer to a desirable durable film.

USEFULNESS OF THE INVENTION

Use of layer 18 provides abrasion and ultraviolet light protection to image 20 and substrate 22.

Abrasivity for layer 18 of the present invention before the image 20 wears away ranges from about 100 to about 400 cycles with CS-10 abrasion wheels commercially available from Taber Industries of Tonowanda, N.Y. and preferably from about 200 to about 400 cycles, depending the type of substrate used.

Layer 18 provides protection to image 20 and substrate 22 without detracting from the appearance of the image. Layer 18 is optically transparent.

EXAMPLES

Several examples were prepared according to the conditions described in Table 1 and tested using the Tape Snap Adhesion Test, as described above, with results reported in Table 2.

The vinyl chloride resin used was VYHH resin; the acrylic resin was B-82 resin; the plasticizer was 13 weight percent of Vikoflex 7170; and the stabilizer was 1.6 weight percent Tinuvin 1130 and 292 for each of Examples 1–9.

TABLE 1

| Example | Formulation of Layer 12 Acrylic (Wt. %) | Vinyl (Wt. %) |
|---|---|---|
| 1 | 33 | 49 |
| 2 | 33 | 49 |
| 3 | 9 | 72 |
| 4 | 9 | 72 |
| 5 | 27 | 55 |
| 6 | 15 | 67 |
| 7 | 15 | 67 |
| 8 | 21 | 61 |
| 9 | 16 | 65 |

Each of nine sets of Examples 1–9 were coated on release liners 14 to provide layers 12 having calipers of 0.076 mm, 0.102 mm, and 0.127 mm and then transferred to substrate 22 at 76° C., 82° C., and 88° C. The Tape Snap Adhesion Test was then conducted 100 times using different strips of tape on different parts of layer 18.

TABLE 2

| | Tape Snap Adhesion Test (% Pass) | | | | | | | | |
|---|---|---|---|---|---|---|---|---|---|
| Example | 76° C. 0.076 mm | 76° C. 0.102 mm | 76° C. 0.127 mm | 82° C. 0.076 mm | 82° C. 0.102 mm | 82° C. 0.127 mm | 88° C. 0.076 mm | 88° C. 0.102 mm | 88° C. 0.127 mm |
| 1 | — | — | — | — | — | — | Pass | Pass | Pass |
| 2 | 99 | 95 | 90 | 99 | 99 | 98 | Pass | Pass | Pass |
| 3 | 0 | 0 | 0 | 95 | 99 | 90 | Pass | Pass | Pass |
| 4 | 10 | 99 | 0 | 80 | 90 | 95 | Pass | Pass | Pass |
| 5 | 80 | 80 | 50 | 99 | 99 | Pass | Pass | Pass | Pass |
| 6 | 0 | 50 | 30 | 99 | 99 | 99 | Pass | Pass | Pass |
| 7 | 0 | 0 | 0 | 95 | 95 | 10 | Pass | Pass | Pass |
| 8 | 10 | 20 | 10 | 99 | 99 | 99 | Pass | Pass | Pass |
| 9 | 30 | 50 | 0 | 98 | 99 | 99 | Pass | Pass | Pass |

Layer 18 can have an adhesion to image 20 and substrate 22 according to a "pass/fail" standard. Adhesion of layer 18 to image 20 and substrate 22 can be measured according to a pass/fail "Tape Snap Adhesion Test" described as follows: After 48 hours after lamination of layer 18 to substrate 22, a 50 cm by 25 cm strip of adhesive tape (No. 8403 brand adhesive tape from 3M Company) is applied to layer 18. The tape is then pulled back at a 180° angle at 25 cm/sec speed and 22 kg (10 lbs.) force. Passing the test means that layer 18 remains entirely on substrate 22; failure is removal of some of layer 18 from image 20 and substrate 22.

Further embodiments of the invention are described in the following examples.

Reliable results for a 76° C. transfer temperature are found with at least a 0.076 mm caliper layer having a formulation of at least 27 wt. % acrylic resin. Reliable results for a 82° C. and 88° C. transfer temperature are found with at least a 0.076 mm caliper layer having a formulation of at least 9 wt. % acrylic resin.

The invention has not been limited to the described embodiments. The claims of the invention follow.

What is claimed is:

1. A layer to cover and protect an imaged substrate, comprising:

a transparent layer comprising vinyl chloride resin, acrylic resin, plasticizer, and stabilizer, wherein the transparent layer has a melt temperature sufficient to cause the transparent layer to melt on one major surface of the imaged substrate without harming the imaged substrate, wherein the amount of vinyl chloride resin ranges from about 49 to about 72 weight percent; the amount of acrylic resin ranges from about 9 to about 33 weight percent; the amount of plasticizer ranges from about 0 to about 33 weight percent; and wherein the mount of stabilizer ranges from about 0 to about 10 weight percent.

2. The layer of claim 1, wherein the layer is part of a composite comprising a release liner.

3. The layer of claim 1, wherein the layer is reconstituted through melting at a temperature ranging from about 76° C. to about 143° C. on the imaged substrate.

4. The layer of claim 1, wherein the mount of vinyl chloride resin ranges from about 55 to about 65 weight percent; the mount of acrylic resin ranges from about 16 to about 27 weight percent; the amount of plasticizer ranges from about 10 to about 16 weight percent; and wherein the stabilizer ranges from about 2 to about 6 weight percent.

5. The latter of claim 4, wherein the layer has a caliper ranging from about 0.05 mm to about 0.13 mm.

6. The layer of claim 5, wherein the layer is reconstituted through melting at a temperature ranging from about 76° C. to about 88° C. on the imaged substrate.

7. A composite comprising a transparent layer covering a durable, imaged substrate, wherein the transparent layer comprises a composition comprising vinyl chloride resin, acrylic resin, plasticizer, and stabilizer, wherein the composition has a melt temperature sufficient to cause the composition to melt on one major surface of the imaged substrate without harming the imaged substrate, wherein the amount of vinyl chloride resin ranges from about 49 to about 72 weight percent; the amount of acrylic resin ranges from about 9 to about 33 weight percent; the amount of plasticizer ranges from about 0 to about 33 weight percent; and wherein the amount of stabilizer ranges from about 0 to about 10 weight percent.

* * * * *

UNITED STATES PATENT AND TRADEMARK OFFICE

CERTIFICATE OF CORRECTION

PATENT NO. : 5,681,660

DATED : October 28, 1997

INVENTOR(S) : Sally J. Bull et al.

It is certified that error appears in the above-identified patent and that said Letters Patent is hereby corrected as shown below:

Column 8:
Claim 5, line 1, "latter" should read --layer--

Signed and Sealed this

Twenty-fourth Day of March, 1998

Attest:

BRUCE LEHMAN

*Attesting Officer*

*Commissioner of Patents and Trademarks*